Aug. 18, 1959   M. M. NYBORG   2,900,168
REACTION MOTOR WITH LIQUID COOLING MEANS
Filed March 24, 1955

INVENTOR.
Meredith M. Nyborg.
BY W. R. Maltby
A. R. McCuely
ATTORNEYS.

2,900,168

REACTION MOTOR WITH LIQUID COOLING MEANS

Meredith M. Nyborg, Camarillo, Calif.

Application March 24, 1955, Serial No. 496,631

2 Claims. (Cl. 257—246)

(Granted under Title 35, U.S. Code (1952), sec. 266)

The invention described herein may be manufactured and used by or for the Government of the United States of America for governmental purposes without the payment of any royalties thereon or therefor.

This invention relates to rocket motors and provides a novel arrangement for circulating liquid coolant around such a motor to prevent damage due to heat generated by the jet.

The invention contemplates the provision of a cooling jacket surrounding the combustion chamber and the exhaust nozzle of a rocket motor, and the circulation through said jacket of a liquid coolant. In order to minimize distortion of the coolant passages as a result of thermal expansion, the cooling jacket is formed of a somewhat flexible material, and pressure differentials existing in the coolant are utilized to maintain the jacket in liquid-tight contact with the outer surface of the combustion chamber and exhaust nozzle.

In present types of jet engines, thermal expansion of the parts, and unfavorable hydraulic pressures, sometimes cause such distortion of coolant passages, that damage to the parts is caused. It is an object of the present invention to avoid such damage. It will also be clear that the concept is equally applicable to several forms of heat exchange apparatus, in addition to rocket motors.

Other objects and many of the attendant advantages of this invention will be readily appreciated as the same becomes better understood by reference to the following description.

Figure 1:
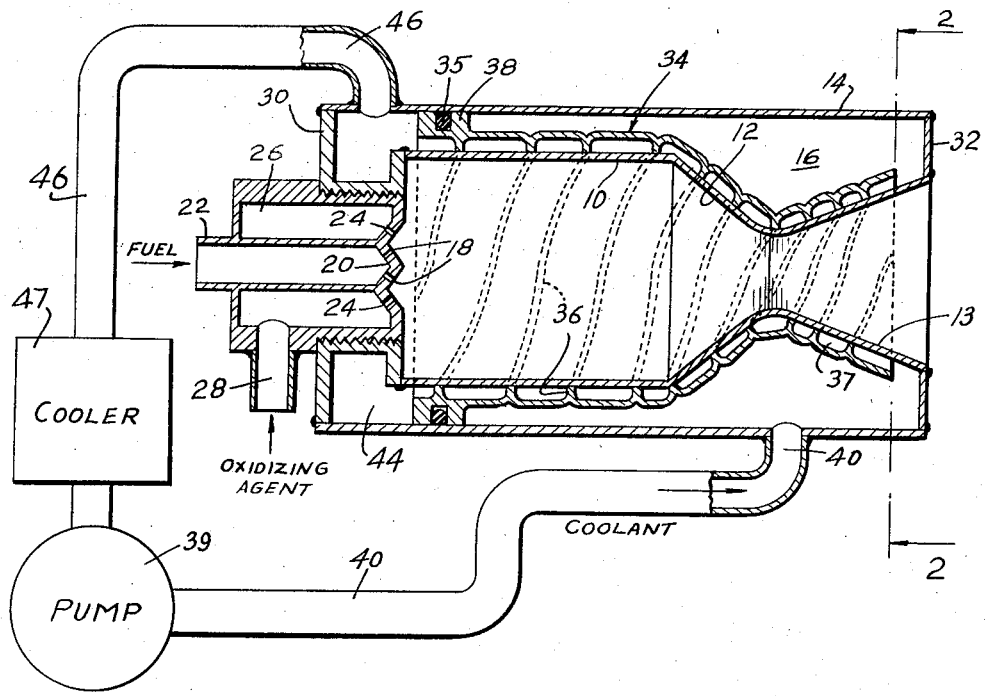
Fig. 1 is a view in longitudinal section of a jet engine provided with cooling apparatus embodying the invention.
Figure 2:
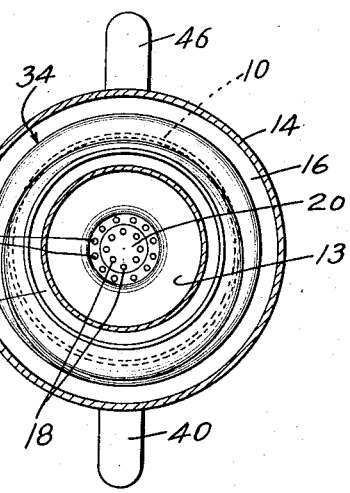
Fig. 2 is a sectional view taken on the line 2—2 of Fig. 1.

The apparatus shown in Figs. 1 and 2 is a jet engine formed with an inner shell comprising a cylindrical wall 10 which forms a combustion chamber, and venturi-shaped walls 12, 13 forming the exhaust passage. A cylindrical outer shell 14 surrounds the inner shell and is spaced therefrom to form an annular chamber 16.

Fuel is supplied to the combustion chamber through nozzles or apertures 18 formed in a wall 20 and communicating with a conduit 22. An oxidizing agent is supplied to the chamber through nozzles or apertures 24 in said wall and communicating with a conduit 26 which is concentric with conduit 22 and supplied from a passage 28. A head 30 is secured as by welding to shell 14 and wall 10 and is threaded to receive the member which forms wall 20 and passages 22 and 26, as shown. The wall 13 is outwardly turned as indicated at 32 and secured to the rear end of shell 14, the element 32 being sufficiently resilient to accommodate unequal longitudinal expansion of shell 14 relative to walls 10, 12 and 13.

A cooling jacket, designated generally by the reference numeral 34, overlies the inner shell and may consist of a body formed of somewhat elastic material such as plastic or sheet metal, formed with inwardly directed flanges or partitions 36 which form a tortuous spiral passage 37 for coolant. At its forward end the jacket is secured to a collar 38 which is formed with an annular groove to receive an O-ring 35 which forms a movable seal between the jacket and the wall 14. Coolant flows from a suitable pressure source such as pump 39, through an inlet conduit 40 to the annular chamber 16, thence into the passage 37, whence it flows to an annular chamber 44 formed by head 30 and wall 14, and thence through outlet passage 46 and through a cooler 47 back to the pump 39. Alternatively, the fuel itself, or the oxidizing agent, may be used as a coolant.

In the operation of the device, the pump 39 is put into operation and the engine started in usual manner, generating large quantities of heat in the combustion chamber and exhaust nozzle. Cooling liquid flows through the path above indicated, absorbing heat through the walls 10, 12, 13. The different parts of the apparatus will be heated in different degree, which will cause the inner shell to expand more than the outer shell and result in movement of seal 35 relative to wall 14.

By reason of the hydraulic friction and the relatively high fluid velocity in passage 37, the pressure within the passage will be less than that obtaining in chamber 16, and this pressure differential will cause the jacket 34 to be pressed inwardly into close contact with the inner shell, maintaining the two in approximately liquid-tight relation. This inwardly directed hydraulic force acting on the elastic material of the cooling jacket will permit a considerable distortion of the several parts of the apparatus without attendant degradation of the liquid-tight fit between the cooling jacket and the inner shell, and without permitting attendant distortion of the cross-sectional geometry of the coolant passages.

Figure 3:
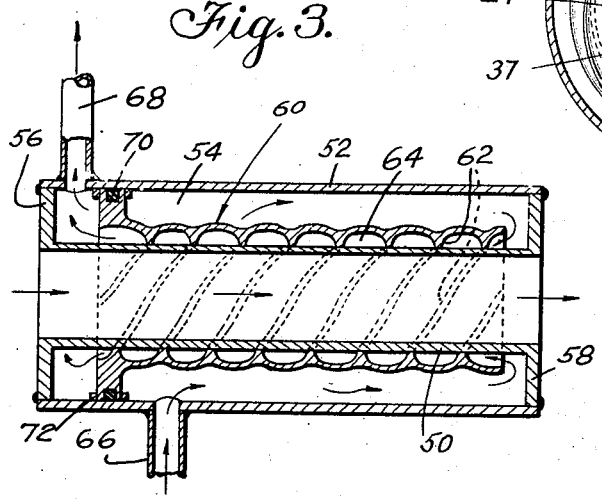
Fig. 3 is a view in longitudinal section of a modified form of the device.

The apparatus shown in Fig. 3 shows the application of the invention to a heat exchanger, comprising a conduit 50 which forms a passage for hot fluid to be cooled. A cylindrical outer shell 52 surrounds the conduit and is spaced therefrom to form an annular chamber 54. Heads 56, 58 are secured to or formed integral with conduit 50 or shell 52 to enclose the chamber. A cooling jacket 60 overlies the conduit 50 and is generally similar to jacket 34, comprising inwardly directed flanges 62 which form a spiral passage 64 for coolant under pressure entering through passage 66 and being exhausted through passage 68. The jacket is provided with a seal 70 similar to that described in connection with Figs. 1 and 2. Means are provided in the form of an annular metal ring 72 welded or otherwise suitably secured to the inner surface of the outer shell 52 for preventing the cooling jacket or intermediate shell 60 from being forced to the left and thus fouling or closing coolant outlet passage 68. The operation of this form of the invention is the same as that shown in Figs. 1 and 2. The "hot" and "cold" fluids may of course be interchanged.

Obviously many modifications and variations of the present invention are possible in the light of the above teachings. It is therefore to be understood that within the scope of the appended claims the invention may be practiced otherwise than as specifically described.

What is claimed is:

1. Heat exchange apparatus comprising, an inner shell adapted to be subjected internally thereof to sufficient elevated temperature to require cooling thereof by a pressurized liquid coolant, a cooling jacket surrounding said inner shell having an integral inwardly directed spiral partition extending between opposite ends of the jacket forming a first concentric spiral cooling chamber open at opposite ends thereof and surrounding said shell, means for limiting the movement of said jacket in one direction with relation to said inner shell, an outer shell surrounding said cooling jacket and defining a second annular cooling chamber, said outer shell extending in an axial direction in excess of the axial length of the cooling jacket to permit entry of said liquid coolant into one end of said spiral cooling chamber and to provide an annular outlet chamber adjacent the other end thereof communicating with the other end of said spiral cooling chamber, an annular flange carried by said cooling jacket adjacent the last named end of said cooling chamber slidably engaging the inside surface of said outer shell, sealing means carried by said flange for preventing fluid leakage from said second chamber to said outlet chamber, said jacket being constructed of flexible material whereby the pressure of said liquid coolant in said second annular cooling chamber forces substantially the entire length of said partition into contact with the outer surface of said inner shell and axial leakage of liquid between successive convolutions of the spiral cooling chamber is minimized, and means for pressurizing, cooling and circulating said liquid coolant through the cooling and outlet chambers of said heat exchanger.

2. In a light weight heat exchanger consisting of light metal shells subject to large temperature extremes and consequent distortion, the combination comprising: a light weight inner shell forming a conduit for the passage of a first fluid at one temperature extreme; a light weight outer shell coaxially surrounding said inner shell and spaced therefrom; end pieces joining the corresponding ends of said inner and outer shells, said end pieces being disposed substantially normal to the axis of said conduit and centrally apertured so as to permit the flow of said first fluid through said conduit; a first chamber defined by said inner and outer shells and said end pieces; a movable, coaxial, and deformable intermediate light weight shell disposed in said first chamber between said inner and outer shells; means to prevent longitudinal movement of said intermediate shell in one direction; sealing means carried by one end of said intermediate shell and coacting with said outer shell to divide said first chamber into a relatively long second high pressure inlet chamber, substantially surrounding the said intermediate shell, and a relatively short third low pressure outlet chamber; a spiral flange carried on the inner surface of said intermediate shell, said spiral flange contacting said inner shell; a spiral passage defined by said intermediate shell, said inner shell and said spiral flange, said spiral passage connecting said inlet and outlet chambers; inlet and outlet means for said inlet and outlet chambers; a second relatively high pressure fluid at the other temperature extreme; and means for pressurizing and circulating said second fluid through said heat exchanger whereby the relatively high pressure second fluid in said inlet chamber deforms said intermediate shell and forces said spiral flange into close contact with said inner shell.

References Cited in the file of this patent

UNITED STATES PATENTS

| | | |
|---|---|---|
| 1,393,452 | Von Recklinghausen | Oct. 11, 1921 |
| 2,003,593 | Jacobsen | June 4, 1935 |
| 2,572,320 | Cox et al. | Oct. 23, 1951 |
| 2,637,973 | Lawrence | May 12, 1953 |
| 2,706,620 | Graves | Apr. 19, 1955 |
| 2,725,218 | Cuming | Nov. 29, 1955 |